March 24, 1964  H. A. TOULMIN, JR  3,125,974
PUNCH AND DIE CONSTRUCTION
Filed March 31, 1958

INVENTOR.
Harry A. Toulmin, Jr.
BY
Toulmin & Toulmin

United States Patent Office 3,125,974
Patented Mar. 24, 1964

3,125,974
PUNCH AND DIE CONSTRUCTION
Harry A. Toulmin, Jr., Dayton, Ohio, assignor to The Commonwealth Engineering Company of Ohio, Dayton, Ohio
Filed Mar. 31, 1958, Ser. No. 724,951
3 Claims. (Cl. 113—49)

This invention relates to plastic tools and dies.

The invention provides a plastic tool for metal forming which is of improved construction.

Plastic tools for metal forming presses, heretofore have had limited use because of their inability to withstand repeated shocks and stresses of press operation. The present invention overcomes these difficulties and provides a shock-resistant, high tensile strength plastic die or tool for shaping metals, plastics and the like materials.

An object of this invention is to provide tools and dies which are of low cost, light weight, and easy to manufacture.

Another object of the invention is to provide dies or molds made of reinforced resin useful for deep drawing heavy metals, or making large metal stampings of a thickness up to ½ inch.

Another object of the invention is to provide a low cost die which can withstand thousands of stampings up to 50,000 without the need of metal inserts or rings to strengthen the die, and which can replace metal punches, dies and pads such as conveniently used.

Still another object is to provide an improved plastic die or mold for use in making metal stampings, flangings, and trimmings, and which offers superior machinability characteristics over conventional so-called plastic tools.

A still further object of the invention is to provide a plastic die which is exceedingly tough and heat-resistant, being capable of retaining screws, dowel supports and steel cutting edges, and which is abrasion-resistant but does not tend to leave scratches when stamping shapes from soft metals, e.g., magnesium, aluminum, tin, and stainless steels.

While it has been proposed heretofore to use glass fiber reinforced resins, it has been found unexpectedly that a marked improvement in toughness and strength is obtained with plastic dies reinforced with glass fibers or filaments which have been metallized by gas plating a metal deposit thereon. This improvement is believed to be due, at least in part, to the increased adhesion developed between the glass fibers and resin which stems from the gas plated metal surface of the glass fibers. Further, gas plated glass fibers imbedded in resin such as the epoxy resins, as hereinafter described, possess excellent resistance to de-lamination. In this respect it overcomes the disadvantages encountered with plastic dies and tools reinforced with ordinary glass fibers or the like refractory ceramic material which has not been metallized by gas plating.

The mold constructed in accordance with preferred embodiments of the invention are disclosed in the drawings, as follows:

FIGURE 1 illustrates in cross section a mold or die made of resin reinforced with nickel gas plated glass fibers, and having a thin, flexible coating of metal which is gas plated thereon, and forming a working surface;

FIGURE 1-A depicts the criss-cross laying of glass fibers as reinforcing material imbedded in the resin;

FIGURE 1-B illustrates a fragmentary glass fiber or filament which is metal coated by gas plating;

Figure 1:
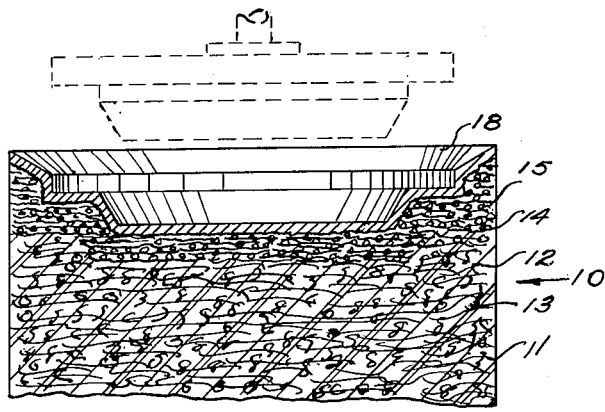

In the drawings, in FIGURE 1 there is shown a plastic mold 10 the body or base portion 11 of which is made up of resin, such as epoxy resin, as hereinafter described. For reinforcing the resin body glass fibers 12 are imbedded therein, as shown. The reinforcing fibers are preferably arranged in the form of woven sheets of glass fibers or filaments, as shown at 12 in FIGURE 1, and extending alternately lengthwise and cross-wise of the mold.

The body of the plastic resinous mold 10 is provided with a compact laminated glass fiber resin section 14, and which is made up of resin impregnated glass fiber sheets 15 laid criss-cross as in FIGURE 1-A, being integral with the base portion 11 of the mold, as illustrated in FIGURE 1.

This shock-absorbing or impact-resistant portion 14 is made up of closely packed metallized glass fiber sheet material 15 bonded together with resin such as makes up the base or body of the mold. Each of the fibers is coated with metal 16, e.g., nickel, the metal coating being preferably applied by gas plating with nickel carbonyl. In place of nickel, chromium, titanium or the like metal may be used as a coating for the glass fibers. The metallized glass fibers or filaments are arranged in contiguous criss-cross layers 17 as illustrated in FIGURE 1-A, the glass fiber layers being imbedded in resin.

The working surface of the mold 10 is composed of metal 18 in the form of a thin shell or coating. This metal working surface provides a protective layer of metal of a few thousands of an inch in thickness, e.g., 0.0001 to 0.025 inch depending upon the metal used, and such as to provide a flexible, or yieldable working metal layer. This flexible metal working surface preferably is deposited by gas plating to provide a thin metal coating of uniform thickness, and one which is hard, and wear-resistant but such as will flex under heavy pressure and not crack. Metallic nickel, chromium or the like, for example, may be gas plated onto the surface of the mold or die at normal atmospheric pressure and at a temperature of about 350° F. using the gaseous heat-decomposable carbonyl of metal. By employing other heat-decomposable metal the temperature will, of course, be adjusted accordingly to bring about the thermal decomposition of the metal bearing compound and deposition of the metal. When gas plating the metal, a uniform thickness of metal coating is readily obtained which is desirable.

In FIGURE 1-B there is illustrated the metal 16 gas plated coating which is deposited on the glass fibers 17. This provides a flexible, metal coating which does not stiffen the glass fibers, but renders them more heat-resistance and adherent to the resin.

Figure 2:
FIGURE 2 is similar cross-section and illustrates a modification wherein a mold is composed of metallized glass fiber flock, for example, gas plated short-length (staple) glass fibers which are distributed evenly throughout the body of the resin.

In FIGURE 2 a modified mold structure is illustrated, and wherein a reinforced resin mold is provided, and wherein short length (staple) glass fibers 20, previously metallized by gas plating, are distributed uniformly throughout the body of the mold. The working surface 21 of the mold is composed of metal similarly as in the mold illustrated in FIGURE 1.

Figure 3:
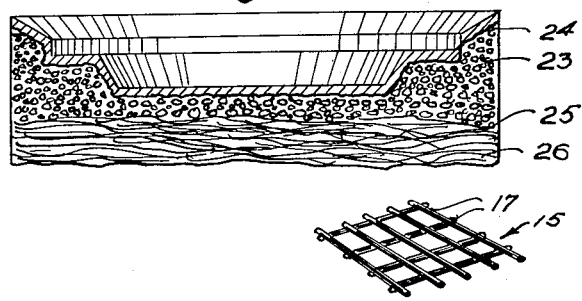
FIGURE 3 illustrates a mold wherein the gas plated glass fibers are concentrated beneath the gas plated metal working surface to function as a cushion.

FIGURE 3 illustrates a resin mold as shown in FIGURE 1, and having a shock-absorbing layer composed of a compact laminated glass fiber-resin section 23 arranged directly beneath and substantially integral with the metal working surface layer 24. The body or base portion 25 of the mold also comprises reinforcing staple glass fibers 26. In this modification the reinforcing glass fibers in the body and shock-absorbing portions of the mold are not metallized as in the structure of molds illustrated in FIGURES 1 and 2.

Figure 4:
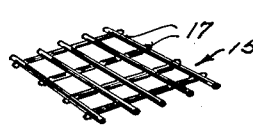
FIGURE 4 illustrates in perspective an aluminum metal tray made using the reinforced resin mold of this invention.
Figure 4:

FIGURE 4 depicts an aluminum metal tray 28 such as may be stamped out using the improved resin-metal glass fiber reinforced mold of the present invention.

Examples of the resin found useful in making the molds of this invention are given as typical.

*Example I*

Polyvinyl chloride resin having the following properties:

|  | (lbs./sq. inch) |
|---|---|
| Tensile strength | 9000 |
| Compressive strength | 11000 |
| Modulus of elasticity in flexure up to | 500,000 |

*Example II*

A polyester resin made by esterification of unsaturated dibasic acids (e.g. maleic acid) and polyvalent alcohols (e.g. diethylene glycol) and which resin is reinforced with glass fibers introduced into the resin in approximately 25% by weight based on the weight of resin before heat curing the mass.

| Tensile strength | p.s.i | 85,000 |
|---|---|---|
| Compressive strength | p.s.i | 15,000 to 47,000 |
| Flexure strength | p.s.i | 41,000 to 107,000 |
| Impact strength | ft. lbs./in | 17,000 to 27,000 |

*Example III*

Epoxy resin as made by reacting bisphenol-A [commercial name for 2,2-bis(p-hydroxyphenyl) propane $CH_3 \cdot C(C_6H_4OH)_2$—$CH_3$ a condensation product of acetone and phenol] with epichlorohydrin in 1:1 mol ratio at a temperature of 100° C. Fiber glass in the form of strands which have been gas plated with nickel (thickness 0.001 inch) is admixed with the resin to form a laminate structure. This is cured by heating at a temperature of 212° F. for one hour and using m-phenylenediamine as a curing agent (14 parts by weight curing agent to 100 parts by weight of resin). The resin content of the laminate structure is approximately 30% by weight. This provides a resin-glass fiber structure having a tensile strength of 90,000 p.s.i. and modulus of elasticity (p.s.i. $\times 10^6$) of 3.7.

*Example IV*

As another example of an epoxy resin the following is given, the parts being by weight.

A mixture of 57 parts of bisphenol, 195 parts diglycid ether, 46.5 parts of aniline and 15 parts of sodium hydroxide is heated for three-fourths of an hour at 212° F. to convert the mass into an infusible product. Where glass fiber reinforcing material is used this is incorporated in the resin mass before placing the product in a mold and heat curing.

Fiber-blass reinforcing material may be in the form of cloth, mats, rovings, strands, yarns, staple fibers, etc. The diameter of the glass fiber strands used is from 1/32 to 1/4 inch.

For providing the shock-absorbing or impact resistant portions of the mold or die, as illustrated in the drawings, the glass fiber comprises substantially 85 to 90% by weight of the mass, the remainder being resin, to function as a binder for the fibers. In the body of the resin-glass fiber reinforced mold or die, the proportionate amount of resin is increased, generally approximately 30 to 70% by weight of the resin-glass fiber mass, depending upon the use to which the plastic tool or die is to be put.

Dies or molding parts or tools made in accordance with this invention may be utilized in the operation of structural steel presses by pressure applied by a rubber bag, if desired.

The glass fibers as used for reinforcement of the resin exhibit increased adhesive properties for the resin, as compared with non-metallized fibers as aforementioned, and accordingly plastic dies and molds made using such reinforcing material wear longer than ordinary glass fiber reinforced plastics.

Tools and dies made of the metallized glass fiber structure in accordance with this invention are lightweight and temperature resistant even upon heating above 700° F. They have increased thermal conductivity. Plastic glass fiber reinforced metal plated dies and molds may be used for short order tooling work, and for producing (a) heat matched molds for low pressure moldings, (b) vacuum forming molds, (c) slush molds, (d) foundry patterns, and precision metal casting molds.

Gas plated reinforced plastic dies constructed as described are useful in molding shapes having sharp radii, and hot stretch forming dies which it has not been possible to form heretofore with ordinary plastic dies.

It will be understood that while there have been described and illustrated certain specific embodiments of the invention, it is not intended thereby to limit the same thereto inasmuch as the invention is manifestly susceptible to various modifications, and substitutions of materials, and which come within the spirit and scope of this disclosure, and as more particularly set out in the appended claims.

What is claimed is:

1. As an article of manufacture, a die composed of resin reinforced with metallized glass fibers, a metal working surface on said die consisting of a metal layer of uniform thickness composed of substantially pure metal, said glass fibers each having an outer shell of metal, said shell of metal being a few thousands of an inch thick and providing a yieldable working metal layer, said die having an impact resistant body portion arranged beneath and united to said metal working surface metal layer, said impact-resistant body comprising closely packed woven strands of said glass fibers as staple glass fibers which are uniformly dispersed in epoxy resin and which are embedded into and bonded with said resin providing a tough, abrasion resistant metal working die.

2. As an article of manufacture, a die for forming shapes, said die having a body composed of synthetic resin plastic and containing imbedded therein reinforced strands of glass fibers, each of said glass fibers being encased in metal, said die having a metal working surface of substantially pure metal and of a uniform thickness to about 0.025 inch, said metal working surface being provided with a reinforcing impact resistant layer immediately beneath said metal working surface and composed of closely packed metallized glass fibers bonded together with resin and integrally united with said body of plastic.

3. As an article of manufacture, a die composed of epoxy resin reinforced with metallized glass fibers, a metal working surface on said die consisting of a metal layer of uniform thickness of about 0.025 of an inch composed of substantially pure metal, said glass fibers each having an outer impregnated shell of metal, said die having an impact resistant body portion disposed directly beneath and united to said metal working surface metal layer, said impact resistant body comprising closely packed woven strands of said metallized glass fibers as staple glass fibers which are uniformly dispersed in epoxy resin and which are embedded into and bonded together with said resin to provide a glass fiber epoxy resin body, providing a tough, abrasion resistant die, said glass fibers constituting from 85 to 90% by weight of the glass fiber-epoxy resin body with the remainder being epoxy resin.

References Cited in the file of this patent

UNITED STATES PATENTS

| | | |
|---|---|---|
| 1,928,712 | Walsh | Oct. 3, 1933 |
| 1,935,916 | Ragsdale | Nov. 21, 1933 |
| 1,994,668 | Russell | Mar. 19, 1935 |
| 1,994,668 | Russell | Mar. 19, 1935 |
| 2,349,920 | Welcome | May 30, 1944 |
| 2,370,562 | Meunier | Feb. 27, 1945 |
| 2,560,599 | Ryan | July 17, 1951 |
| 2,699,415 | Nachtman | Jan. 11, 1955 |
| 2,751,626 | Lyijynen | June 26, 1956 |
| 2,765,248 | Beech et al. | Oct. 2, 1956 |
| 2,834,052 | Hunn | May 13, 1958 |
| 2,836,530 | Rees | May 27, 1958 |